No. 782,992. PATENTED FEB. 21, 1905.
C. G. SCHMIDT & J. F. PFLUM.
FAT SKINNING MACHINE.
APPLICATION FILED NOV. 30, 1903.
2 SHEETS—SHEET 1.
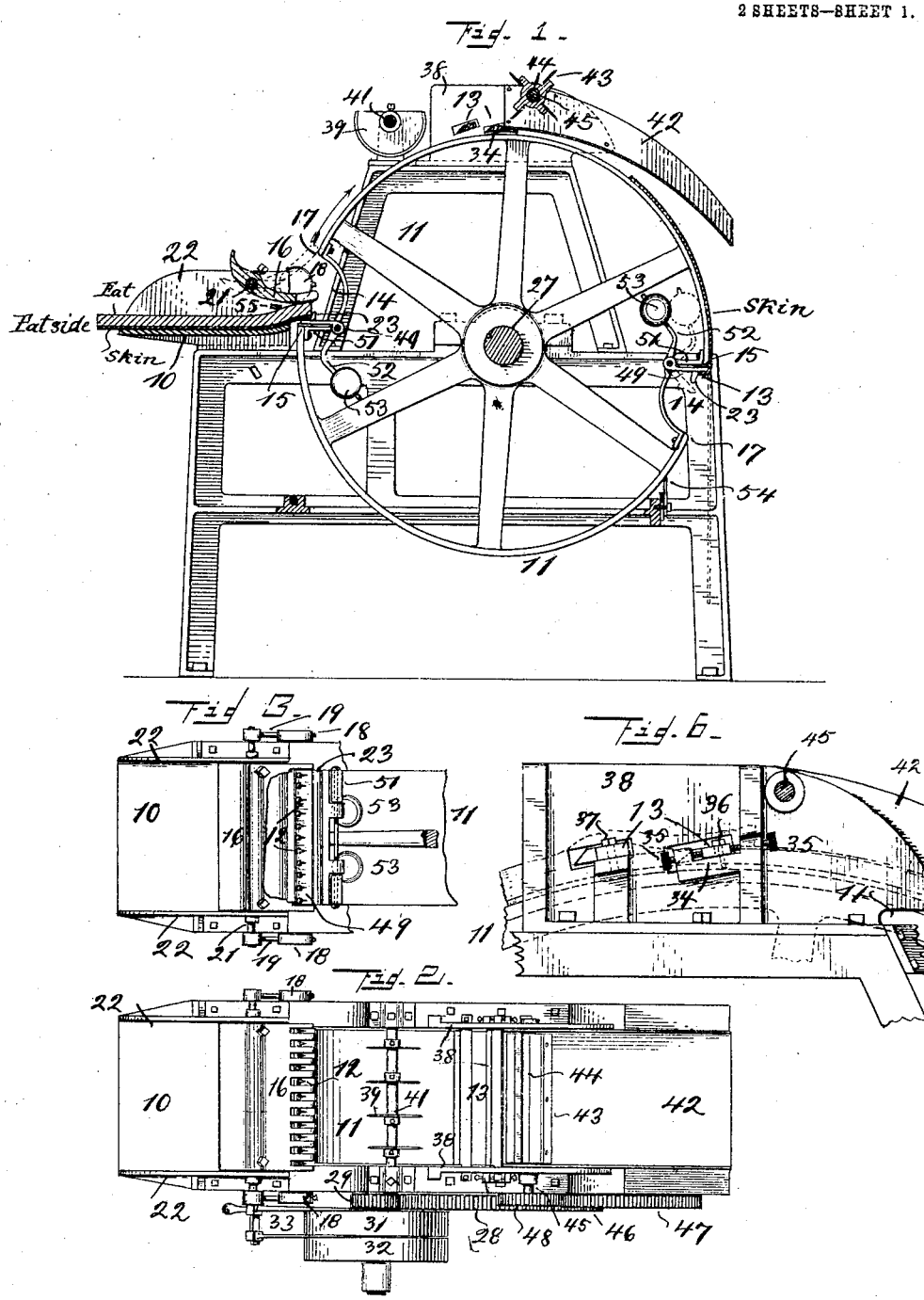

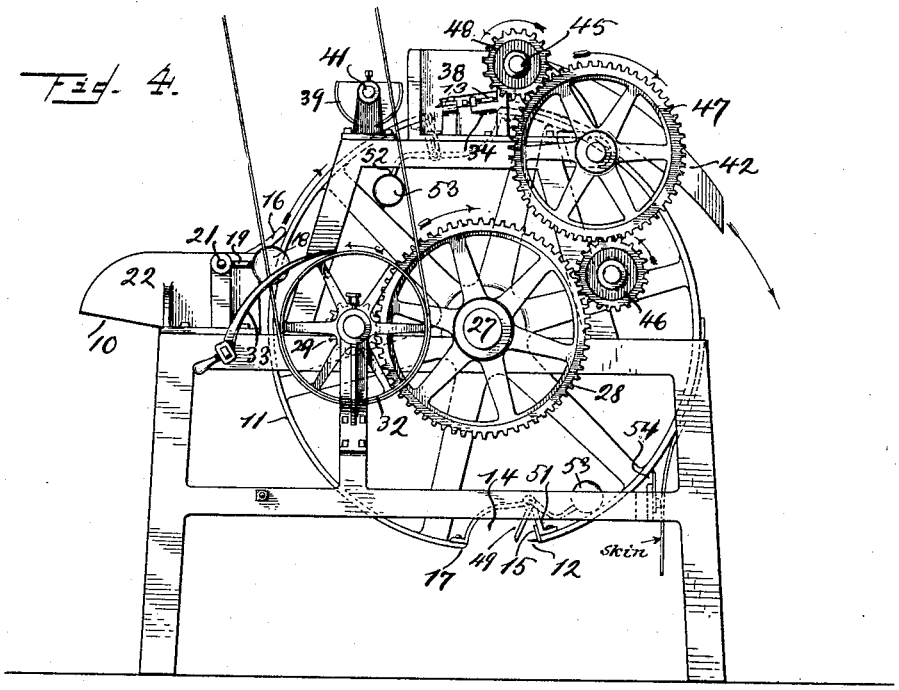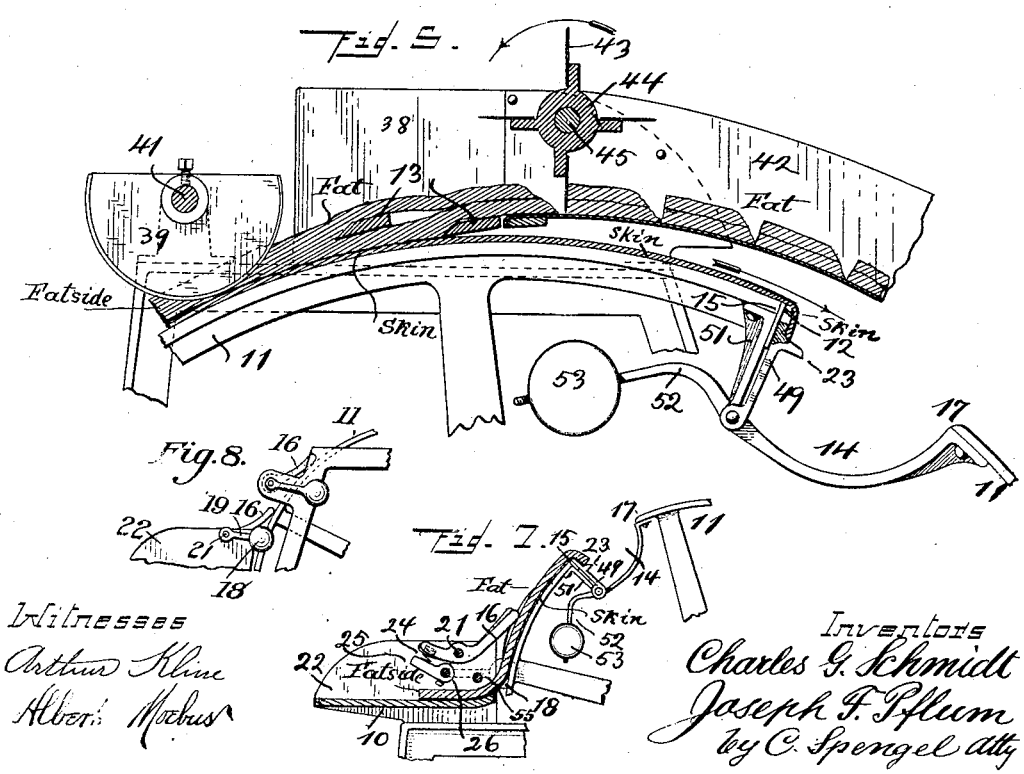

No. 782,992. Patented February 21, 1905.

UNITED STATES PATENT OFFICE.

CHARLES G. SCHMIDT AND JOSEPH F. PFLUM, OF CINCINNATI, OHIO, ASSIGNORS TO THE CINCINNATI BUTCHERS' SUPPLY CO., OF CINCINNATI, OHIO, A CORPORATION OF OHIO.

FAT-SKINNING MACHINE.

SPECIFICATION forming part of Letters Patent No. 782,992, dated February 21, 1905.

Application filed November 30, 1903. Serial No. 183,091.

*To all whom it may concern:*

Be it known that we, CHARLES G. SCHMIDT and JOSEPH F. PFLUM, citizens of the United States, residing in the city of Cincinnati, in the county of Hamilton and State of Ohio, have invented certain new and useful Improvements in Fat-Skinning Machines; and we do declare the following to be a clear, full, and exact description thereof, attention being called to the accompanying two sheets of drawings, with the reference characters marked thereon, which form also a part of this specification.

This invention relates to improvements in machines used for scraping hides and animal-skins on the flesh side in order to remove fat and meat therefrom, the object being to either obtain such fat and meat or to clean the skins to render them suitable for other purposes, or both objects may be combined.

The invention consists of certain means and mechanism, as the same, with the operation thereof, is described and claimed hereinafter, the construction being also illustrated in the accompanying two sheets of drawings, in which—

Figure 1 is a vertical section of the machine. Fig. 2 is a top view of it. Fig. 3 is a top view of the feed-table with adjacent parts in section and others broken away. Fig. 4 is a side elevation of the machine. Fig. 5 is an enlarged section of the upper part of the machine, it being the upper part of Fig. 1. Fig. 6 is an enlarged portion of the upper part of Fig. 4. Fig. 7 in parts of a view similar to Fig. 1 shows a modified construction of the matter illustrated. Fig. 8 shows a further modification in a similar view.

As to sizes, proportions, and arrangement the machine is designed for use in connection with the meat, fat, and skins of hogs, and it is more particularly shown as used for operating on the rear sides of the hog's carcass, separating from each other the so-called "back fat" and the skin to which it adheres. The fat which is to be removed is only that which remains after a knife has been used by hand to remove the larger part of it adhering to the skin. These rear sides composed of fat and skin, hereinafter called "fat side," are usually cut in approximately rectangular shapes, and with the skin side down they are fed into the machine by being placed upon a suitable feed table or shelf 10. The main operating part of the machine consists, substantially, of a rotating circular carrier 11, provided with attaching devices in form of pins 12, which take a hold of the fat side by engaging the skin thereof and move the same thereafter against the sharp edges of a number of stationary knives 13, supported so as to be successively at closer distances to the face of the carrier and parallel thereto, and whereby the fat is sliced off in layers, the last knife cutting closest to the skin. Fig. 5 shows this operation most plainly. Pins 12 are set in a recess 14, formed in the face of the carrier, so as to be below such face, they projecting from a shelf 15, to which they are rigidly secured and which extends inwardly from the face of the carrier and into the recess thereof. This recess permits the front end of the fat side when pushed against the face of the carrier to pass somewhat ahead when recess 14 arrives opposite this inner end of the feed-table, the object being to bring a part of the fat side near its end above pins 12 to permit these latter to obtain a hold. This engagement is accomplished by means of a hinged flap 16, which is raised and held elevated by the face of the carrier until the upper edge 17 of recess 14 arrives under said flap, when this latter, losing the support under its outer edge, is free to drop. In so dropping it falls upon the fat side and drives the under side of the same onto and against pins 12, causing them to enter the former. This effect is increased by weights 18, carried on arms 19, which project from pin 21, to which flap 16 is hinged, and whereby this latter is given the action necessary to forcibly knock the fat side against the pins, causing these latter to be driven into the same. This pin is supported in the sides 22 of feed-table 10, and which sides serve as means to guide the fat sides properly against the face of carrier 11 and into recesses 14 thereof. The entrance of the front end of the fat side into this recess is limited by a ridge serving as a stop 23. The fat side so engaged is now drawn in under the readily-yielding flap 16, which latter, however, by maintaining contact with said side serves to force and spread the same closely against and over the face of the carrier. In due time the fat side is carried against the cutting edges of the scraping-knives 13, two of which are shown, one cutting in advance of the other one. This first knife may, however, be also omitted. The action of flap 16 against the fat side may also be obtained by springs, and to provide for fat of unequal thickness this flap may be in several parts or sections, all arranged side by side, each being individually pressed against the fat, the object being to reach all parts of the same for the purpose of pressing it tightly to and evenly against the face of the carrier. This modification is illustrated in Fig. 7, 24 indicating the springs pressing against the sectional flap 16. These springs rest on a shelf 25, supported between sides 22, or this shelf may be in form of a flap and supported on a pin 26, similar to pin 21, so that the action of weights 18 may be added to the action of the springs.

For purpose of actuating the carrier we mount the same on a shaft 27, which is positively rotated in any suitable manner—as, for instance, by a cog-wheel 28, driven by a pinion 29. This latter is rotated by a pulley 31, a loose pulley 32 being also provided, together with the usual belt-shifter 33.

The number of recesses—that is, points at which the carrier receives the fat side, if there is to be more than one point—depends on the circumference of the carrier, regard to be had that the space between the recesses is sufficient to receive the longest fat side. In our case we show two of such recesses.

If there are more than one knife, they are set at graduated distances away from the face of the carrier, the first one being farthest away, while the last one sits close to the carrier, its distance therefrom being dependent on the thickness of the skin, to which it cuts as close as possible, finishing thereby the operation, the other knife serving simply as a preliminary cutter. This last or finishing knife may also be supported adjustable to suit the thickness of the skin or to maintain its cutting edge in proper position as the same wears down. For such purpose both ends of this knife rest upon inclined surfaces 34, (see Fig. 6,) which surfaces are arranged at an angle to the face of the carrier, so that as this knife is moved down on these inclined surfaces it will approach the carrier, while otherwise it will move away therefrom. This adjustment is had between set-screws 35, one being loosened and then followed up by the other. After adjusted the knife is tightened down and held by a set-screw 36, passing through a slot in the ends of the knife. Similar set-screws 37 are used to hold the other knife; but this latter need not be adjustable. The supports for this knife are formed in the sides of two frame members 38. The fat so removed from the skin is usually rendered out, which operation is aided and quickened if the fat is delivered in pieces of reduced size. For such purpose there is a set of vertically cutting or scoring knives 39, supported stationary on a rod 41, the action being by the carrier, which draws the fat side under and through between these knives, causing them to divide the fat into strips lengthwise. These knives are set so as to cut merely through the fat without, however, touching the skin.

That part of the fat separated from the skin by the action of knives 39 and 13 is pushed ahead by the other part, which still adheres to the skin and which latter is positively pulled ahead by pins 12, which hold it to the revolving carrier. This separated fat is thereby pushed onto a chute 42, also held between frame members 38. Immediately after having passed the last skinning-knife and upon entering this chute the separated fat is again divided crosswise by a revolving cutter-head consisting of a number of knives 43, attached to a hub 44 and mounted upon a shaft 45. This latter is rotated in any suitable manner—as, for instance, by a train of gear-wheels 46 47 48, driven from cog-wheel 28, as best shown in Fig. 4. It will now be noted that the fat is divided threefold: first, in longitudinal strips by scoring-knives 39, next into layers by the skinning-knives 13, and finally crosswise into blocks by the cutter-head knives 43. These blocks one after the other are pushed onto and down over chute 42, from which the discharge may be received in any suitable way—as, for instance, by a vessel. It will also be observed that in all these operations the skin is never touched by any knife nor reduced in size, thus leaving it intact and rendering it available for other purposes—as, for instance, for manufacture into leather.

The skin after having served to carry the fat against and through under the various knives for the purpose of permitting this latter to be separated from the former is carried on and in due time thrown off from the carrier. This requires, first, disengagement of the forward end of the skin from pins 12, which is accomplished by a so-called "stripper" 49, occupying when the fat side is fed against the carrier a position close against the upper side of shelf 15, from which pins 12 project, said stripper being perforated or notched out to clear said pins, which latter projects sufficiently above said stripper to allow for sufficient penetration into the skin, so that none of these parts interferes with the function of the other. At that time—that is, when a fat side is fed in—said stripper has no further function whatsoever and may be considered as forming practically a part of and being equivalent to shelf 15 in the bottom of recess 14. Stop 23, which gages the position of the fat side when fed in, is therefore not connected to shelf 15, but formed on this stripper 49. This latter is hingedly supported on brackets 51, projecting inwardly from the face of carrier 11 and serving also as a means to sustain shelf 15, which carries the pins. At the inner edge of this stripper there are one or more inwardly-projecting arms 52, which carry one or more weights 53. The operation of these parts is such that as they, with the attached skin, pass down on the other or opposite side of the machine this weight will swing over after the parts approach and pass beyond about a position as is shown at the right of Fig. 1. (Observe also dotted lines and lower part of Fig. 4.) The motion of the weight is in such a direction that it will cause the stripper to swing up on pins 12, thereby stripping the edge of the skin off from them. The skin will now readily drop away from the face of the carrier, (see Fig. 4;) but to insure that the carrier be completely cleared before approaching again the point of feeding we provide a scraper 54. As has before been stated, the effect of the spring or weight-actuated flap 16 is against the fat side to drive the skin part of the same against and onto pins 12. Should the attendant fail to feed, this action would be against parts of the carrier or shelf 15 and stripper 49, against which the flap would knock. This being undesirable as well as injurious, we provide means in shape of stops, (shown at 55,) which prevent such by arresting the action before these parts come in contact, the stops being so located, however, that they do not interfere with or limit the action when a fat side is introduced. The front edge of the flap is notched to clear the pins, preventing all possibility of injury to them. If necessary, additional pressure-exerting devices, similar to flap 16, may be interposed between flap 16 shown and the skinning-knives, as illustrated in Fig. 8.

Having described our invention, we claim as new—

1. In a machine for separating in fat sides the skin and fat adhering to each other, the combination of a circular, rotary carrier, provided with recesses across its face, pins fixedly secured within these recesses, a feed-table upon which a fat side may be fed to the carrier in a manner that its front edge enters one of these recesses and above the pins therein, a pressure-exerting flap hinged to said feed-table to drive the skin part against these pins and hold it against the face of the carrier, cutting devices held stationary across the face of said carrier against which the moving fat side is carried to separate its fat and skin parts from each other and mechanism operating to disengage the skin from the pins after such separation.

2. In a machine for separating in fat sides, the skin and fat adhering to each other, the combination of a general frame, a circular, rotary carrier supported thereby with stationary pins affixed to it and adapted to carry a fat side around with the carrier during part of its rotation, the skin part of such fat side engaging said pins, stationary cutting devices supported on the frame, against which the moving fat side is carried to divide the fat and skin portions from each other, and a pivotally-attached, weight-actuated stripper attached to and moving with the carrier and operating to push the skin off from the teeth after such division.

3. In a machine for separating in fat sides the skin and fat adhering to each other, the combination of a general frame, a drum-shaped carrier supported thereby, means to rotate the same, pins arranged in rows across the face of the drum and fixedly attached to it, a flap of a width sufficient to reach across such a row of pins and pivotally supported on the frame in a manner that its free end leans normally against the face of the drum-shaped carrier and stationary cutting means also supported on the general frame and against which the fat side is moved by the pins after the action of the flap has caused the same to become attached to said pins.

4. In a machine for separating in fat sides the skin and fat adhering to each other, the combination of a general frame, a circular, rotary carrier supported thereby, recesses in the face of this carrier, a feeding device whereby a fat side may be fed into these recesses, pins provided in these recesses, a flap hingedly attached to the frame, means whereby its free end is yieldingly held against the face of this carrier and caused to strike into these recesses and against a fat side therein and stationary cutting devices supported on the general frame against which the fat side is moved by the carrier.

5. In a fat-skinning machine, the combination of a frame, a rotary carrier journaled in said frame and cutting devices supported by the frame adjacent to and across the face of the carrier, said carrier comprising a cylindrical body provided with fixed pins, a perforated stripping-plate, through which said pins project, and means for moving said stripping-plate up and down on said pins.

6. In a fat-skinning machine, the combination of a frame, a rotary carrier supported thereby provided with recesses across its face, cutting devices attached to this frame and supported across the face of the carrier and adjacent thereto, pins fixedly attached to this carrier and within the recesses thereof, a sectional, pressure device also supported across the face of the carrier, means whereby each of its sections is yieldingly held against such face and caused when opposite one of these recesses to strike into the same and means to dispose of and disengage the separated fat and skin from the machine.

7. In a machine for separating in fat sides, the skin and fat adhering to each other, the combination of a circular, rotary carrier, recesses in the face thereof, pins fixedly secured within these recesses and below the face of the carrier, means operating to cause the end of a fat side to engage these pins within their recess, after which said fat side is carried forward by the carrier, cutting devices against which the moving fat side is carried and separated into its skin and fat portions, a perforated stripper occupying a position normally at the base of the pins and means to move this stripper up on the pins in a manner to disengage therefrom the skin held thereby.

8. In a machine for separating in fat sides, the skin and fat adhering to each other, the combination of a circular, rotary carrier, recesses in the face thereof, a shelf forming the bottom of these recesses and projecting radially inwardly from the face of the carrier, pins affixed to this shelf and projecting into the recesses below the face of the carrier, a stripper-plate resting normally on the shelf mentioned, the same being perforated to clear the pins projecting from the shelf, means operating to drive the end of a fat side against these pins, with the stripper-plate below, after which said fat side is carried forward by the carrier, cutting devices against which the moving fat side is carried and whereby it is disintegrated into its skin and fat portions, one of these portions moving with the pins until the separation is complete and means to raise the stripper-plate up on the pins to clear therefrom the portions adhering thereto.

In testimony whereof we hereunto set our signatures in the presence of two witnesses.

CHARLES G. SCHMIDT.
JOSEPH F. PFLUM.

Witnesses:
C. Spengel,
Arthur Kline.